US006520606B1

(12) United States Patent
Robinson

(10) Patent No.: US 6,520,606 B1
(45) Date of Patent: Feb. 18, 2003

(54) URN DISPLAY SYSTEM

(76) Inventor: Hewitt Robinson, 1641 E. Broad Ripple Ave., Indianapolis, IN (US) 46220

( * ) Notice: Subject to any disclaimer, the term of this patent is extended or adjusted under 35 U.S.C. 154(b) by 0 days.

(21) Appl. No.: 10/086,468

(22) Filed: Mar. 1, 2002

Related U.S. Application Data

(63) Continuation-in-part of application No. 09/557,438, filed on Apr. 25, 2000.

(51) Int. Cl.$^7$ .................................................. F16B 12/00
(52) U.S. Cl. .............................. 312/111; 312/290; 27/1
(58) Field of Search ................................ 312/111, 107, 312/108, 198, 290; 27/1; 220/23.6, 4.27; 206/508

(56) References Cited

U.S. PATENT DOCUMENTS

| | | | | | |
|---|---|---|---|---|---|
| 1,662,359 | A | * | 3/1928 | Brennan | 27/1 |
| 2,326,414 | A | * | 8/1943 | Thompson | 220/4.27 |
| 3,529,730 | A | | 9/1970 | Thompson | |
| 3,732,602 | A | * | 5/1973 | Vigh | 27/1 |
| 3,754,805 | A | | 8/1973 | Pangburn et al. | |
| 3,841,726 | A | | 10/1974 | Andros et al. | |
| 3,925,944 | A | | 12/1975 | Pickel | |
| 3,990,198 | A | | 11/1976 | Ortutay | |
| 4,521,999 | A | | 6/1985 | Flanagan | |
| 4,688,359 | A | | 8/1987 | See | |
| D304,641 | S | | 11/1989 | Bourassa | |
| 4,977,652 | A | * | 12/1990 | Graham | 27/1 |
| D313,325 | S | | 1/1991 | Delaney et al. | |
| 5,287,603 | A | | 2/1994 | Schorman | |
| 5,379,499 | A | * | 1/1995 | Jackson | 27/1 |
| 5,401,200 | A | * | 3/1995 | Ellis | 220/4.27 X |
| 5,477,594 | A | | 12/1995 | LePage | |
| 5,590,446 | A | * | 1/1997 | Hicks | 27/1 |
| 5,625,933 | A | | 5/1997 | Neuberger et al. | |
| 5,692,277 | A | | 12/1997 | Chen | |
| 5,692,344 | A | | 12/1997 | Zarth | |
| 5,709,441 | A | | 1/1998 | Bartling et al. | |
| D395,121 | S | | 6/1998 | Eickhof | |
| 5,765,269 | A | | 6/1998 | Zarth | |
| 5,815,897 | A | * | 10/1998 | Longstreth | 27/1 |
| 5,832,575 | A | * | 11/1998 | Sturino | 27/1 |
| D403,896 | S | | 1/1999 | Bartling et al. | |
| 5,881,505 | A | | 3/1999 | Larkin, III et al. | |
| 5,966,868 | A | * | 10/1999 | Cox | 47/66.6 |
| D420,838 | S | | 2/2000 | Riga | |
| 6,023,822 | A | | 2/2000 | Luebke | |
| 6,041,483 | A | | 3/2000 | Burch | |
| 6,044,532 | A | | 4/2000 | Bowling et al. | |
| 6,052,954 | A | | 4/2000 | Dudek et al. | |
| 6,167,600 | B1 | * | 1/2001 | Williams et al. | 27/1 |
| 6,295,708 | B1 | * | 10/2001 | Gersten | 27/1 |

FOREIGN PATENT DOCUMENTS

| | | | | |
|---|---|---|---|---|
| FR | 2513293 | * | 3/1983 | |
| FR | 2658229 | * | 9/1991 | 52/79.1 |
| JP | 06327731 | * | 11/1994 | 27/1 |
| WO | 9600052 | * | 1/1996 | |

* cited by examiner

*Primary Examiner*—Lanna Mai
*Assistant Examiner*—Hanh V. Tran
(74) *Attorney, Agent, or Firm*—Woodard, Emhardt, Naughton Moriarty & McNett

(57) ABSTRACT

An urn display system is provided that can include anywhere from two or more urns stacked one upon another, and an ornament display can be placed on top of the stacked urns. Various connections between adjacent ones of the stacked urns are provided. Also provided is a wall panel removably engaged in a hole in the urn wall to provide access to the receptacle through the hole.

36 Claims, 9 Drawing Sheets

URN DISPLAY SYSTEM

CROSS-REFERENCE TO RELATED APPLICATION

The present application is a continuation-in-part of pending U.S. patent application Ser. No. 09/557,438 filed on Apr. 25, 2000.

BACKGROUND OF THE INVENTION

The present invention relates generally to urns, and more particularly to systems for displaying urns.

Cremation of the remains of humans and animals, such as pets, has now become a common alternative for preservation and burial of the deceased. The ashes of the cremated decedent are sometimes distributed in accordance with the wishes of the decedent, but can also be deposited in urns for storage and memorialization purposes. The urns may be retained by the family in a home or other location, or held in permanent storage in a mausoleum. One example of a storage and display system for urns is described in U.S. Pat. No. 4,688,359 to See. There is described therein a mausoleum for cremated remains which includes linear and columnar displays that have a support structure with shelves for displaying transparent vessels. Urns are placed in the transparent vessels. The vessel support structures also have apertures that transmit light from a light source within the support structure and provide for illumination and internal reflection of light in the transparent vessels.

Other examples of devices for displaying urns include pedestals having two or more vertically arranged shelves on which urns are placed for display. See, for example, U.S. Pat. No. 5,709,441 to Bartling et al. and U.S. Des. Pat. No. 403,896 to Bartling et al.

While the prior art shows various structures for displaying urns, there remains needs for other urn display systems that is not met in the prior art. The urn display system should provide for displaying one or more urns in an efficient and visually pleasing manner. The urn display system should also allow the person or entity displaying the urns to have flexibility and options in how and where the urns are displayed. The display system should be able to be used in an indoor or outdoor setting while allowing the deceased to be memorialized in a respectful and dignified manner. The present invention is directed to meeting these needs, among others.

SUMMARY OF THE INVENTION

The present invention includes an urn display system that has one urn stacked on top of another urn.

According to one aspect of the invention, there is provided an urn display system that includes a first urn with a wall extending about a receptacle and also extending between a bottom portion and an upper portion of the first urn. A second urn is also provided with a wall extending about a receptacle and also extending between a bottom portion and an upper portion of the second urn. The bottom portion of the second urn is positioned on and secured to the upper portion of the first urn.

According to a further aspect of the invention, there is provided an urn display system that includes at least one urn having a wall extending about a receptacle. The wall also extends between a bottom portion and an upper portion of the at least one urn. There is further provided a passage in the wall extending between the bottom portion and the upper portion of the at least one urn. An ornament display is positioned on the upper portion of the at least one urn and means are provided in the passage to couple the ornament display to a power source.

Another aspect of the invention provides an urn display system with a side wall panel removable for access to the urn receptacle, even when urns are stacked one upon another. Once the crematory remains are placed in the urn receptacle, the access panel can be sealingly engaged to the urn.

These and other objects, advantages, forms, features, embodiments, and aspects of the present invention can be further discerned from the following description of the illustrated embodiments.

DESCRIPTION OF THE ILLUSTRATED EMBODIMENTS

Figure 1:
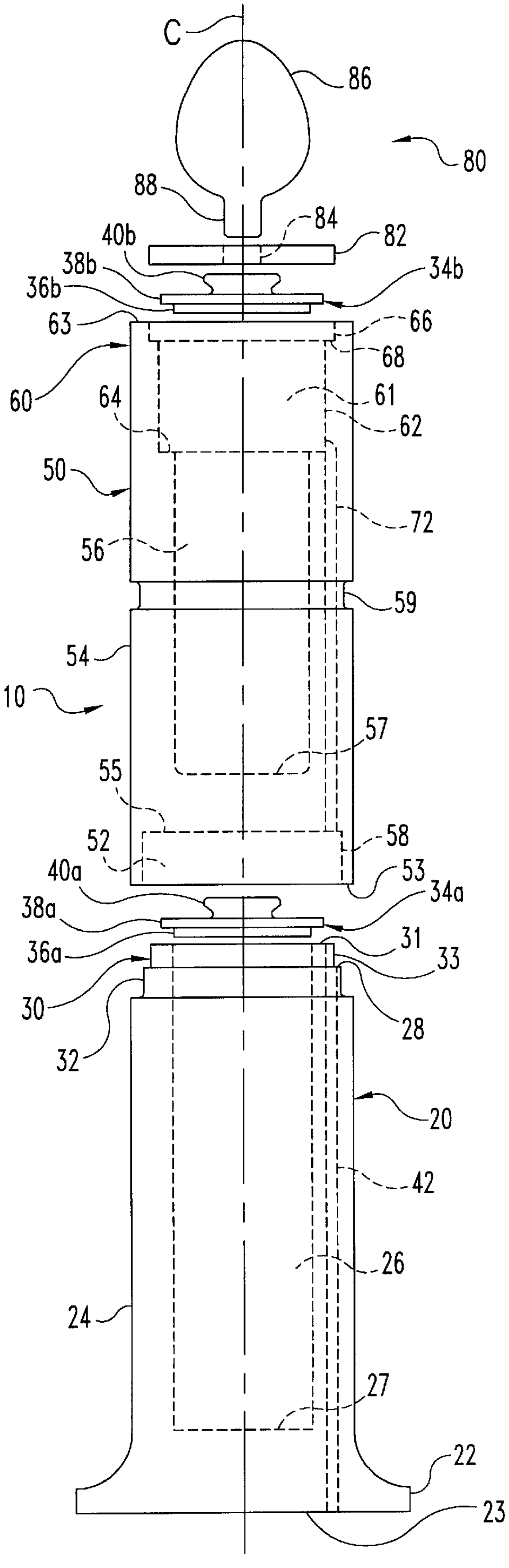
FIG. 1 is a front elevational view of an urn display system of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended. Any such alterations and further modifications in the illustrated devices, and any such further applications of the principles of the invention as illustrated therein are contemplated as would normally occur to one skilled in the art to which the invention relates.

Referring now to FIG. 1, there is illustrated therein an urn display system 10 according to one aspect of the present invention. Urn display system 10 has a central axis C and includes a base urn or first urn 20 and an upper urn or second urn 50 positioned on first urn 20, providing an urn display system 10 in which one urn is stacked upon another. An ornament display 80 can be positioned at the top of urn display system 10. Urn display system 10 provides a visually pleasing columnar arrangement that includes at least first urn 20. Urn display system 10 further provides for the memorialization of the crematory ashes of decedents placed in respective ones of the first urn 20 and second urn 50 using the columnar arrangement of first urn 20 and second urn 50.

Figure 2:
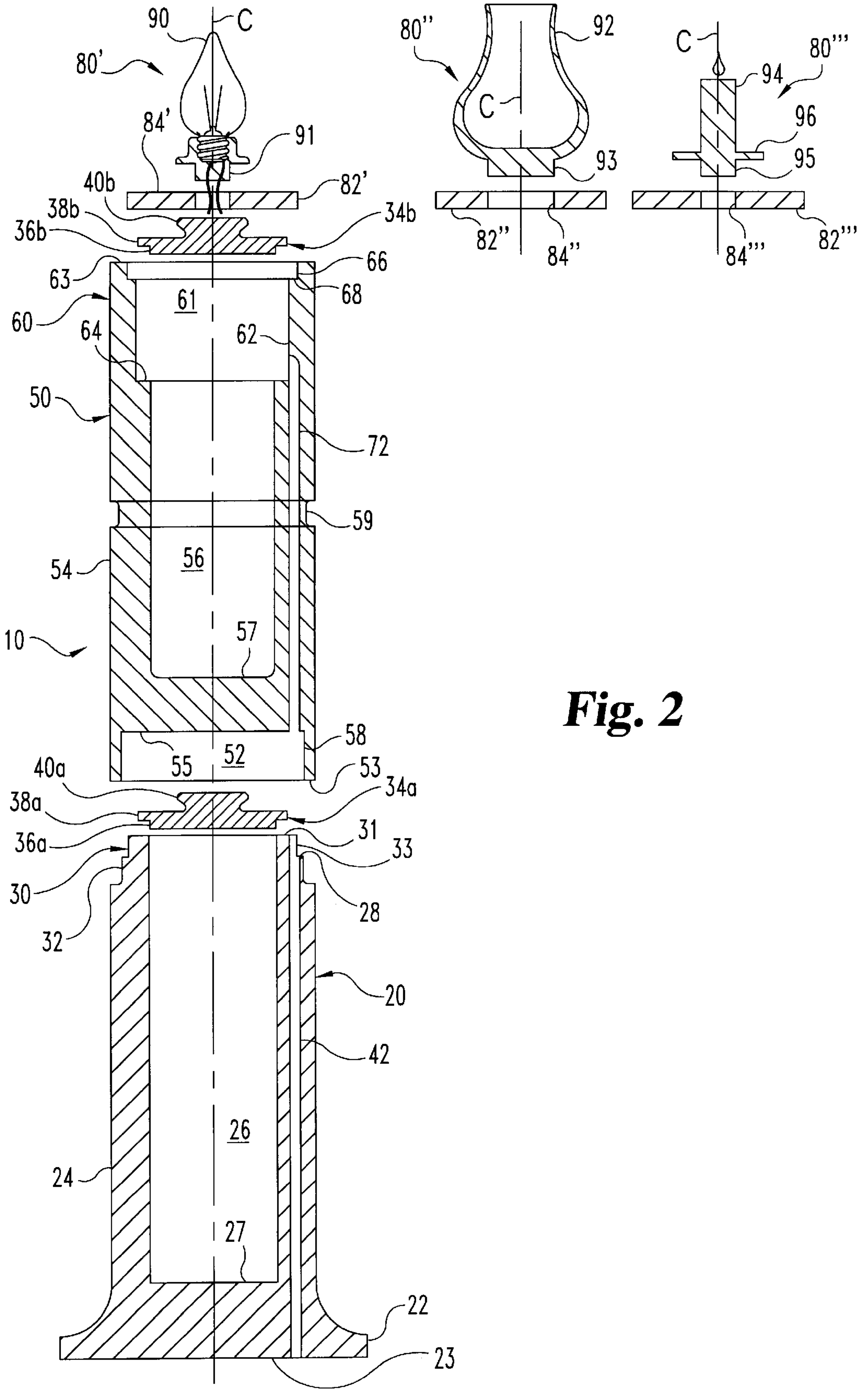
FIG. 2 is a cross section through the center line of the urn display system of FIG. 1 looking in the same direction as FIG. 1.

Referring now further to FIG. 2, a cross section of urn display system 10 is provided along central axis C looking in the same direction as FIG. 1. First urn 20 includes base 22 having a bottom surface 23 for supporting urn display system 10 on the ground or a support pad or foundation (not shown.) Base 22 in the illustrated embodiment is flared outwardly towards bottom surface 23 to spread the bearing load of urn display system 10 over a larger surface area. Extending upwardly from base 22 is a wall 24 which extends about a receptacle 26. Receptacle 26 has a bottom surface 27 and receives the ashes of the decedent placed in first urn 20.

First urn 20 further has an upper portion 30 that secures second urn 50 on first urn 20. Upper portion 30 includes a top surface 31 that supports a first cap 34*a* placed over receptacle 26. Cap 34*a* seals receptacle 26 when the ashes are placed therein, and may be either permanently affixed to first urn 20 or removably affixed to provide later access to receptacle 26. Cap 34*a* includes middle portion 38*a* having a lower portion 36*a* extending downwardly therefrom. Middle portion 38*a* has a portion that extends radially outwardly about lower portion 36*a*. Lower portion 36*a* fits within the upper portion of receptacle 26, while the radially outwardly extending portion of middle portion 38*a* abuts against top surface 31 to support first cap 34*a* on first urn 20. An upper member 40*a*, which in the illustrated embodiment can serve as a handle, extends upwardly from middle portion 38*a* towards second urn 50.

Second urn 50 includes a bottom surface 53 and a wall 54 extending upwardly from bottom surface 53 to an upper portion 60 of second urn 50. Wall 54 defines a second receptacle 56 having a bottom surface 57, and the ashes of a second decedent can be placed into and stored in second receptacle 56. Receptacle 56 extends upwardly from bottom surface 57 to a cap support surface 64 formed in the interior of second urn 50 above and about receptacle 56.

A second cap 34*b* that in the illustrated embodiment is identical to first cap 34*a* is positionable on cap support surface 64. As discussed above, cap 34b includes a middle portion 38*b* having a lower portion 36*b* extending downwardly therefrom. Middle portion 38*b* has a portion that extends radially outwardly about lower portion 36*b*. Lower portion 36*b* fits within second receptacle 56, while the radially outwardly extending portion of middle portion 38*b* abuts against cap support surface 64 to support second cap 34*b* on second urn 50. An upper member 40*b*, which in the illustrated embodiment can serve as a handle, extends upwardly from middle portion 38*b*.

Second urn 50 has an upper cavity 61 formed between receptacle 56 and a top surface 63. Upper cavity 61 has a sidewall 62 extending between support surface 64 and a top plate support recess 66 formed in second urn 50 adjacent top surface 63. Recess 66 has a plate support surface 68 extending about cavity 61. Plate support recess 66 receives a plate 82 of ornament display 80 therein so that plate 82 is flush with top surface 63.

Second urn 50 includes a bottom recess 52 formed in bottom surface 53 that extends upwardly therefrom toward receptacle 56. Bottom recess 52 is placed over upper portion 30 of first urn 20 to secure second urn 50 thereto. In the illustrated embodiment, bottom recess 52 includes inner sidewalls 58 extending to an inset surface 55. Upper urn securing portion 30 of first urn 20 includes an inset wall portion 33 extending downwardly from top surface 31 to a lip 28, and lip 28 extends about inset wall portion 33. In the illustrated embodiment, a groove 32 extends about urn 20 in wall 24 below upper portion 30, and a second groove 59 is provided in wall 54 about the mid-portion of second urn 50. Grooves 32, 59 aesthetically enhance urn display system 10.

Second urn 50 is placed on first urn 20 by positioning bottom recess 52 over upper portion 30 so that bottom surface 53 abuts against lip 28 and inset wall portion 33 is adjacent to or in contact with sidewalls 58 of recess 52. Although not necessary, an epoxy or other material known to those skilled in the art may also be provided between lip 28 and bottom surface 53 to further stabilize the assembly of first urn 20 and second urn 50. To provide further bearing support, upper member 40*a* of first cap 34*a* can also contact inset surface 55 of bottom recess 52. Other embodiments contemplate internal and/or external fasteners, brackets, bolts, screws, dowels or other known means to secure second urn 50 to first urn 20. These further means for securing second urn 50 to first urn 20 may be provided in addition to or as an alternative to upper portion 30 and bottom recess 52.

Ornament display 80 may be placed on the second urn 50 with second cap 34*b* supported by support surface 64. Ornament display 80 includes a plate member 82 for supporting an ornament 86 on second urn 50. As shown in FIG. 1, plate member 82 has central hole 84, and ornament 86 has a stem 88 positionable in central hole 84 to secure ornament 86 thereto. Plate 82 is placed in plate support recess 66 with ornament 86 extending above top surface 63. As shown in FIG. 2, other types of ornament displays are also contemplated. For example, ornament display 80' has plate 82' with a central hole 84' configured to receive stem 91 of a light 90. Ornament display 80" has a plate 82" with a central hole 84" configured to receive a stem 93 of vase 92, which can hold flowers or other types of ornamentation or memorabilia. Ornament display 80'" has a plate 82'" with a central hole 84'" to receive a stem 95 of a candle ornament 94. Candle ornament 94 has a flange 96 extending thereabout to support the candle 94 on plate 82'".

A passage 72 is formed through second urn 50 in wall 54, and extends between and opens at cavity 61 of upper portion 60 and recess 52. First urn 20 similarly includes a passage 42 in wall 24 extending between and opening at top surface 31 of upper portion 30 and bottom surface 23. Second urn 50 can be placed on first urn 20 so that the passages 72 and 42 form a continuous passage through urn display system 10. Preferably, passages 42 and 72 are formed in walls 24 and 54 separately from receptacles 26 and 56, respectively, so that the urn passages are isolated from the receptacles. Wiring can be pulled through urn display passage into cavity 61 in order to electrically couple light 90 or other electrically powered ornament to a power source. In a further embodiment, tubing or piping is placed through the urn display passage to couple the ornament display to a gas source to provide an ornament display with a flame, such as with candle 94 or a torch. In yet another embodiment, water is supplied through a pipe placed in the urn display passage to couple an ornament display to a water supply.

Figure 3:
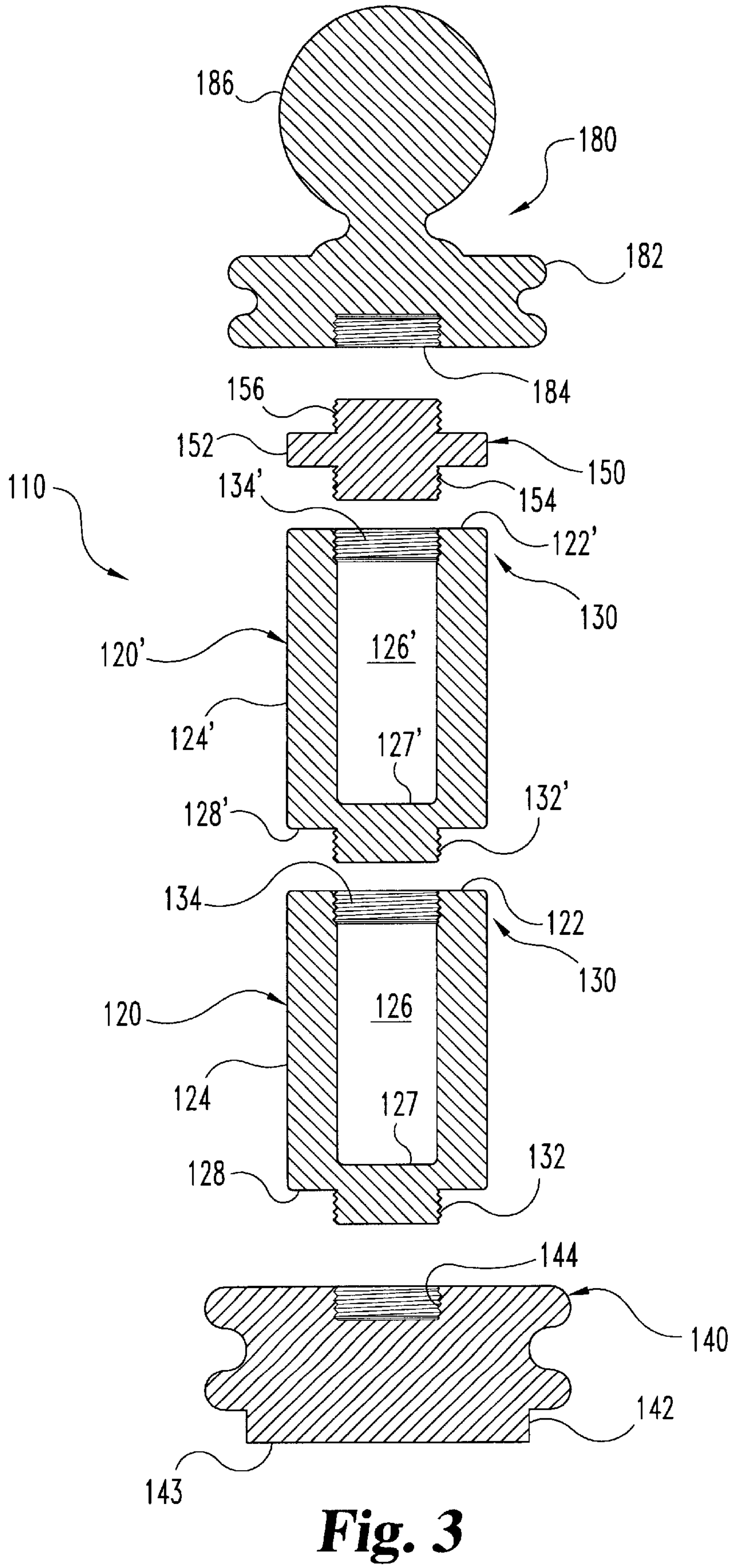
FIG. 3 is a cross section of another embodiment urn display system of the present invention.

Referring now to FIG. 3, another embodiment of an urn display system according to the present invention is illustrated. Urn display system 110 includes first urn 120 having a wall 124 extending about receptacle 126. Receptacle 126 has a bottom surface 127 and the ashes of decedent are placed in receptacle 126. Wall 124 extends between a top surface 122 and a bottom surface 128. Extending downwardly from bottom surface 128 is a stem 132. Urn 120 includes upper portion 130 for securing a second urn 120' to first urn 120. Urn 120' is substantially identical to first urn 120 and includes a second stem 132' extending downwardly from bottom surface 128' . A wall 124' extends from bottom surface 128' to top surface 122' about a receptacle 126' having a bottom surface 127'. Receptacle 126' receives the ashes of a second decedent. An upper portion 130' is provided on second urn 120' to secure a third urn or ornament display to second urn 120'.

Second urn 120' is supported by urn portion 130 of first urn 120 by securing stem 132' to upper portion 130. In the illustrated embodiment, receptacle 126 includes an upper threaded portion 134, and stem 132' is threaded for threaded engagement with threaded portion 134. It is contemplated that threaded portion 134 can have a depth sufficient so that second stem 132' can be threaded into threaded portion 134 until bottom surface 128' is adjacent to or contacts top surface 122.

Urn display system 110 further includes a base 140 for supporting first urn 120, second urn 120', and ornament display 180. Base 140 includes s lower portion 142 having a bottom surface 143 that bears on the ground, foundation, or other support surface. Lower portion 142 can be embedded in the ground to further stabilize urn display system 110. An opening 144 is provided in base 140 and receives stem 132 of first urn 120. In the illustrated embodiment, stem 132 is threaded and engages threads provided in opening 144. Other embodiments contemplate other ways for supporting the urns on base 140, such as anchor bolts, dowels, or making first urn 120 integral with base 140.

Ornament display 180 is secured to second urn 120' via a coupler 150. Coupler 150 has lower stem 154 extending downwardly from a middle plate member 152. Lower stem 154 is secured to upper portion 130' of second urn 120'. In the illustrated embodiment, lower stem 154 is threaded and engages threads of a threaded portion 134' formed in the upper portion of receptacle 126'. An upper stem 156 extends upwardly from middle plate member 152. An opening 184 formed in base 182 of ornament display 180 secures ornament display 180 to stem 156. In the illustrated embodiment, upper stem 156 is threaded and mates with threads provided in opening 184. An ornament 186 is supported on ornament base 182, and may include a light, vase, bulb, sphere, or other object as would occur to those skilled in the art.

Figure 4:
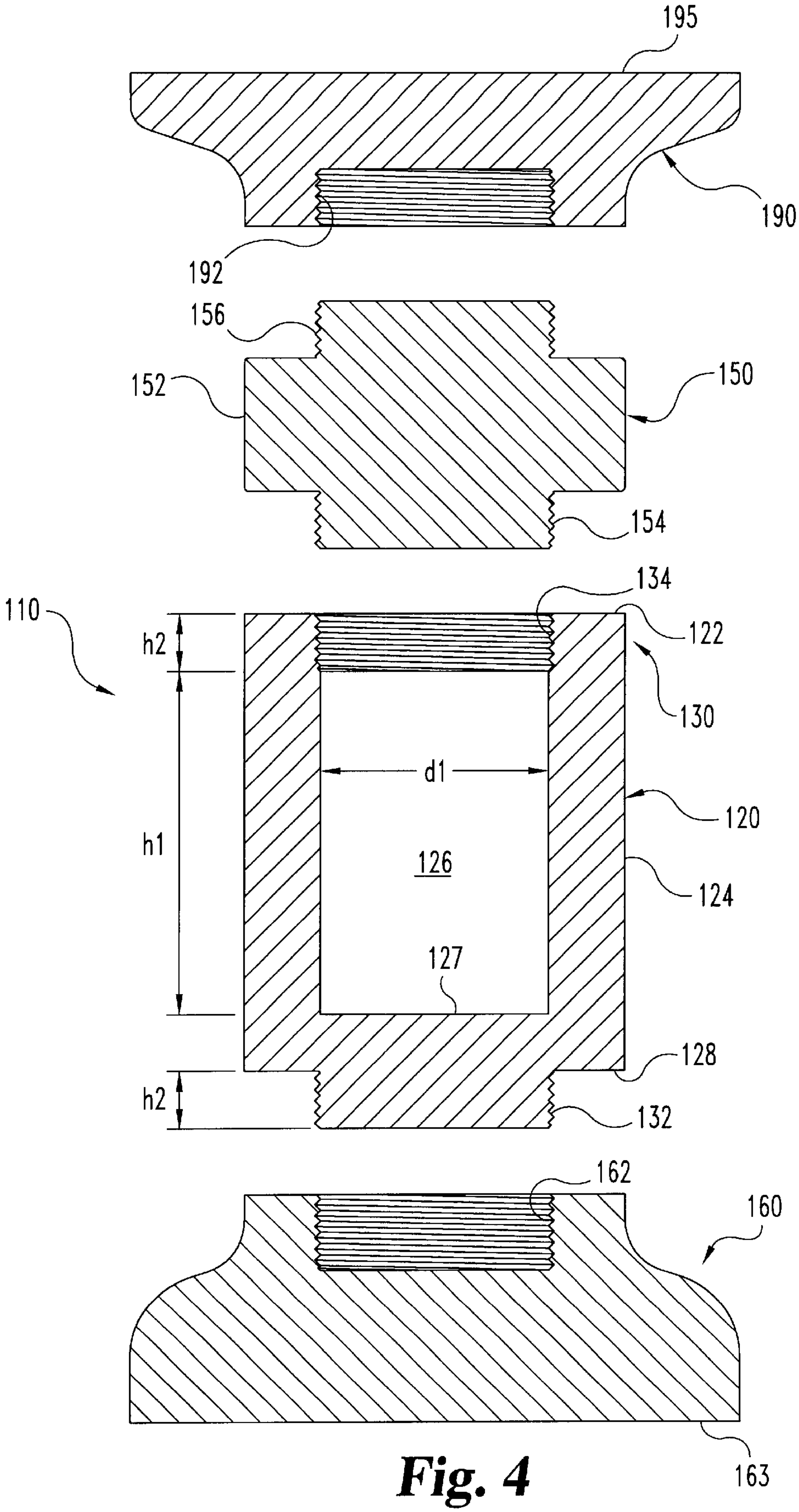
FIG. 4 is an elevational view of a further embodiment urn display system of the present invention.

As shown in FIG. 4, ornament 186 may be replaced with a pedestal display top 190 having an opening 194 configured to secure display top 190 to upper stem 156 of coupler 150. A vase, plaque or other ornamentation or memorabilia can be placed on an upper surface 195 of display top 190. First urn 120 is positionable in a flared pedestal base 160, which has an opening 162 formed therein configured to mate with lower stem 132 of first urn 120 and a bottom surface 163 to support urn display system 10 in the ground or support pad.

As shown further in FIG. 4, the dimensional attributes of urn 120 will now be discussed. Urn 120 has a main storage height h1 of about 9 inches and a diameter d1 of about 6 inches, providing a storage volume of about 250 cubic inches for the ashes of the decedent, which is adequate for most female and male persons. Further, height h2 of stem 132 and threaded portion 134 provides an overlap that is about 1½ inches. Urns 20 and 50 can be provided with similar storage volumes and overlaps. Of course, it is to be understood that larger or smaller storage volume could be provided for the ashes of a pet and humans as needed. It should be further understood that it is contemplated that the urns and urn receptacles of the present invention can have any size or cross-sectional shape, such as for example, square, rectangular, non-circular, or any polygon.

It should be further understood that the urn display systems of the present invention might have various arrangements that differ from the illustrated embodiments and accomplish the purposes of the present invention. For example, bottom recess 52 of second urn 50 can be threaded to engage threads provided on upper urn securing portion 30 of first urn 20. In a further example, base 140, 160 may have threaded stems extending therefrom and to be placed in a threaded cavity formed in the bottom of urn 120. A coupler 150 could be provided between each of the adjacent urns 120, 120' in order to secure these urns to one another. It is further contemplated that the stems and openings for receiving the stems are not threaded, but fit together in frictional engagement, and can be provided with additional securing and/or sealing means such as an O-ring seal. Also, although not illustrated in FIG. 3, urn 120 can be provided with a passage for wiring, as described above with respect to urn display system 10, so that wiring can be pulled therethrough to light an ornament display supported by urn 120'.

The present invention contemplates that urn display systems 10, 110 can be made from marble. Other materials known to those skilled in the art may also be used for the various urn display systems 10, 110 so long as these materials are suitable for use as urns and capable for supporting the loading of the urn display system.

Figure 5:
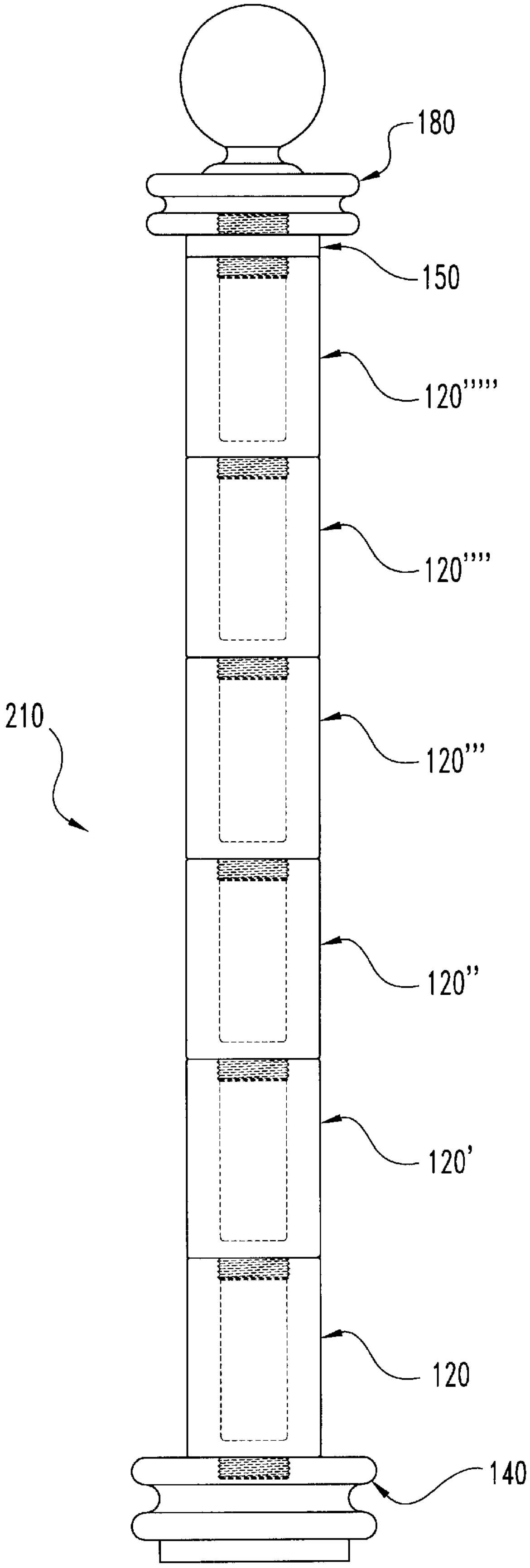
FIG. 5 is an elevational view of yet another embodiment urn display system of the present invention.

Referring now to FIG. 5, an urn display system 210 is provided that includes ornament display 180, base 140, and a number of urns secured one upon another as shown by the six urns 120, 120', 120'', 120''', 120'''', 120''''' to provide a columnar arrangement. Of course, it is contemplated that the urn display system 210 may include fewer than six urns or more than six urns. It should be further understood that urns 20 and 50 could similarly be adapted to provide such a display of a number of urns.

Figure 6:
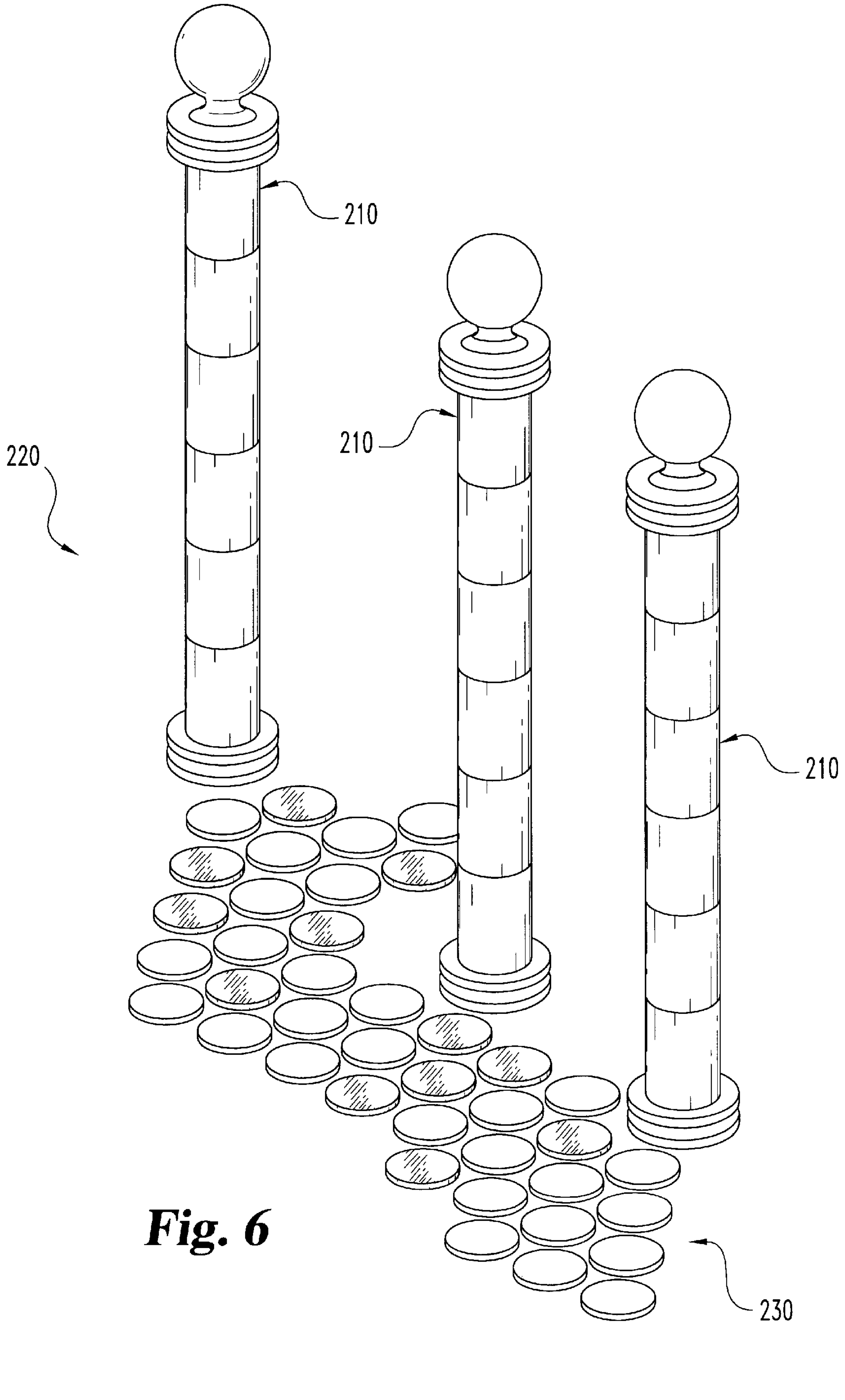
FIG. 6 is a partial, perspective view of a garden employing an urn display system of the present invention.

Referring now to FIG. 6, there is provided a garden 220 in which the number of columnar urn displays, such as urn display system 210, are provided for display. Such a garden 220 could be to memorialize deceased pets or loved ones at a home, at a mausoleum type setting, or other desired location. The display could also used in either indoor or outdoor settings. The various urn display systems 210 can be oriented around a walkway 230 which is provided so that those wishing to pay their respects to the deceased may walk through and view the urns. Memorial information concerning the deceased may be engraved on the urns or the access member of the urn, placed on a plaque fixed to the urns or urn display systems, or engraved on pavers forming the walkway 230. Of course, it should be understood that urn display systems 10, 110 could also be used in garden 220. Further, it should be understood that the urn display systems could have various heights in accordance with the number of deceased memorialized in the particular display. Since it is contemplated that the individual urns can be accessible by disassembling the urn display system, the urn display systems could also have urns that are empty for later storage of a not yet deceased person or animal.

Figure 7:
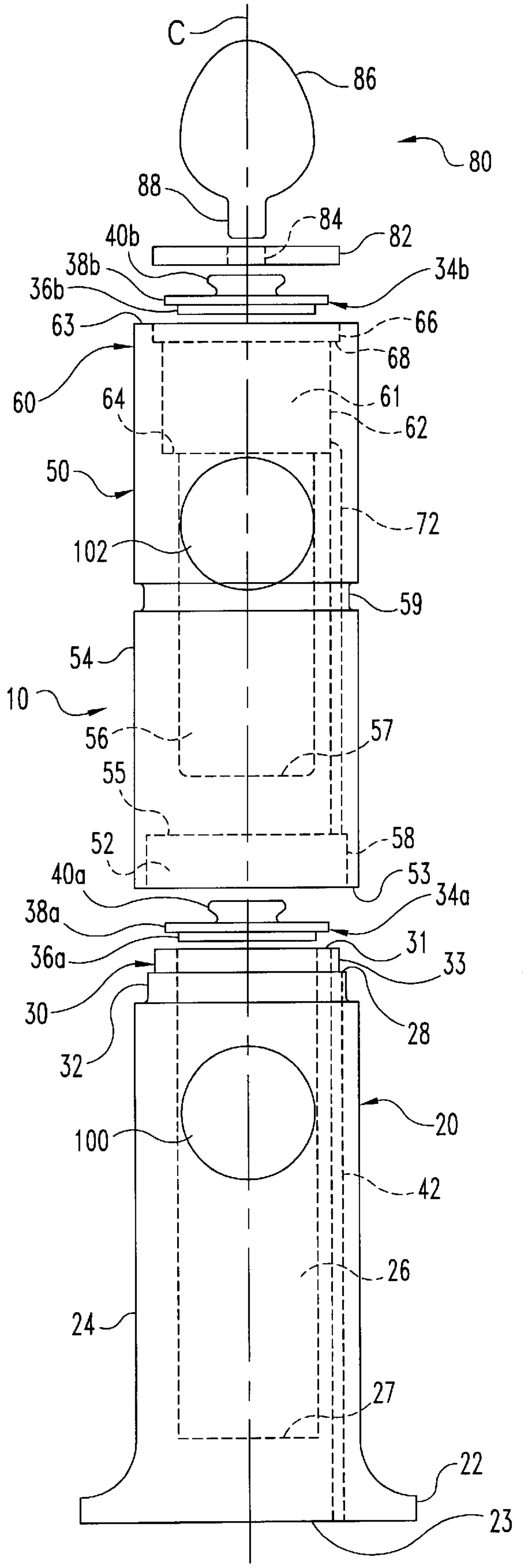
FIG. 7 is a front elevational view of the urn display system of FIG. 1 in which the urns are provided with wall panels.

Referring now to FIG. 7, there is shown another embodiment of urn display system 10. First urn 20 includes a first wall panel 100, and second urn 50 includes a second wall panel 102. First wall panel 100 is positioned in wall 24 of first urn 20, and when removed provides a hole in wall 24 in communication with receptacle 26. Second wall panel 102 is positioned in wall 54 of second urn 50, and when removed provides a hole in wall 54 in communication with receptacle 56.

It is contemplated that these holes in walls 24, 54 occupied by wall panels 100, 102 are sufficiently large for placement of crematory remains and/or an ash container therethrough into receptacle 26, 56. Thus, second urn 50 can be stacked upon first urn 20 and ornament display 80 assembled before placement of crematory remains in either or both of receptacles 26, 56. Thereafter, crematory remains can be placed in receptacles 26, 56 by removing the respective wall panel 100, 102.

For example, access panel 100 can be removed from wall 24 of first urn 20 when display system 10 is assembled for placement of crematory remains in receptacle 26. Wall panel 100 can then be placed back into the access hole in wall 24 and engaged thereto. Wall panel 100 can also be sealed to prevent removal of the crematory remains and/or containers from receptacle 26 unless display system 10 is disassembled so that receptacle 26 can be accessed through the top of first urn 20. Urns 20, 50 can be relatively heavy so that disassembly is impossible or difficult without the use of the proper lifting equipment, further securing the crematory remains and/or containers in receptacle 26.

Figure 8:
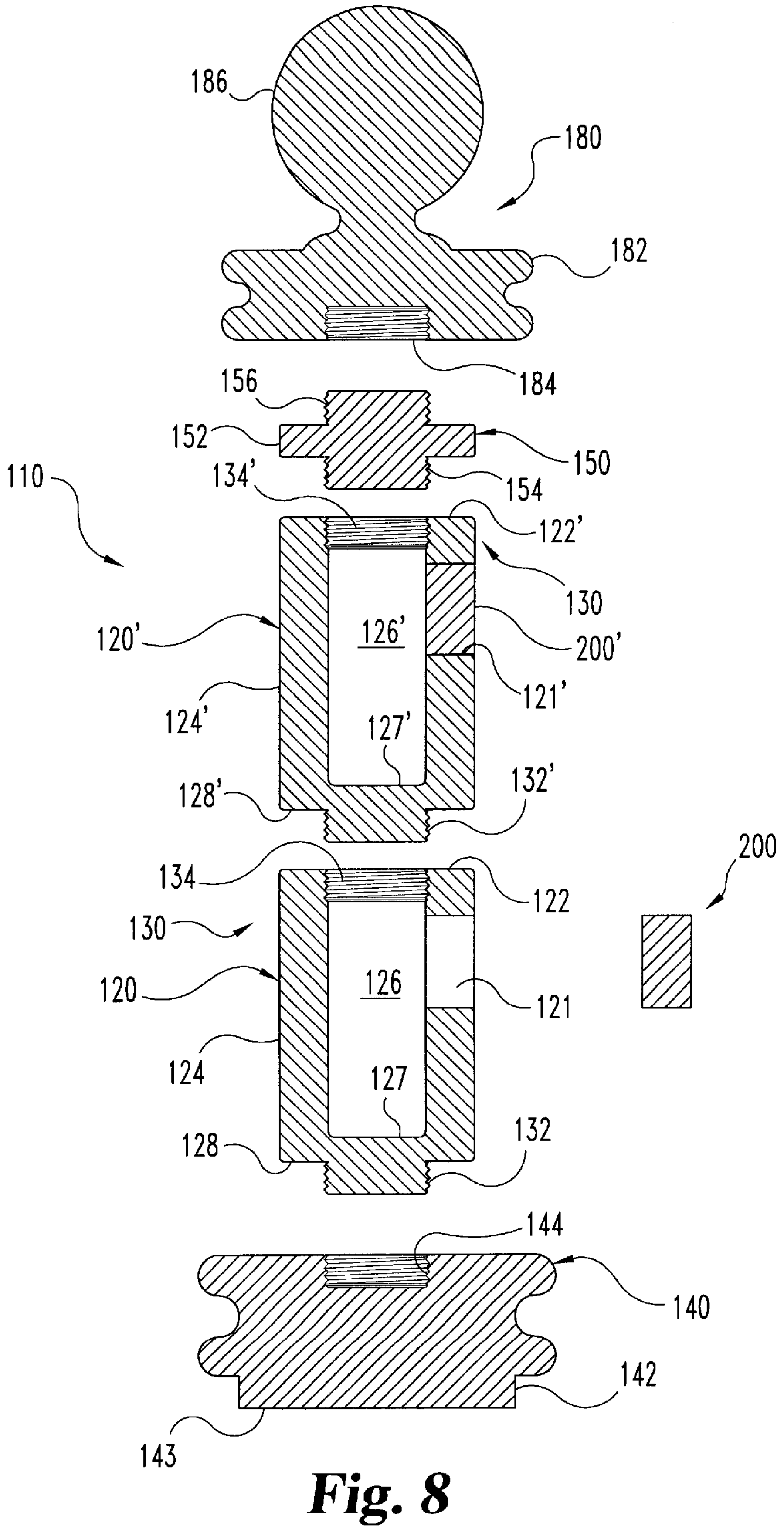
FIG. 8 is a cross section of the urn display system of FIG. 3 in which the urns are provided with wall panels.

Referring now to FIG. 8, there is shown urn display system 110 having a first wall panel 200 removed from wall 124 of first urn 120 and a second wall panel 200' positioned in wall 124' of second urn 120'. Wall panels 200, 200' can be similar to wall panels 100, 102 discussed above. With wall panel 200 removed, hole 121 is provided through wall 124 for placement of crematory remains in urn receptacle 126. Second urn 120' has a similar hole when second wall panel 200' is removed therefrom. Holes 121, 121' are positioned below threaded portion 134, 134' so that the stem 132' and cap 150 will not interfere with the adjacent wall opening 121, 121'. Urn display system 110 can be completely assembled without placement of the crematory remains in one or both of the urn receptacles 126, 126' since wall panels 200, 200' provide access to urn receptacles 126, 126' without disassembly of urn display system 110.

Wall panels 200, 200' are illustrated having a thickness that is the same as that of the corresponding wall 124, 124'. Other embodiments contemplate that wall panels 200, 200' are provided with a wall thickness that is less than that of the corresponding wall 124, 124'.

Figure 9:
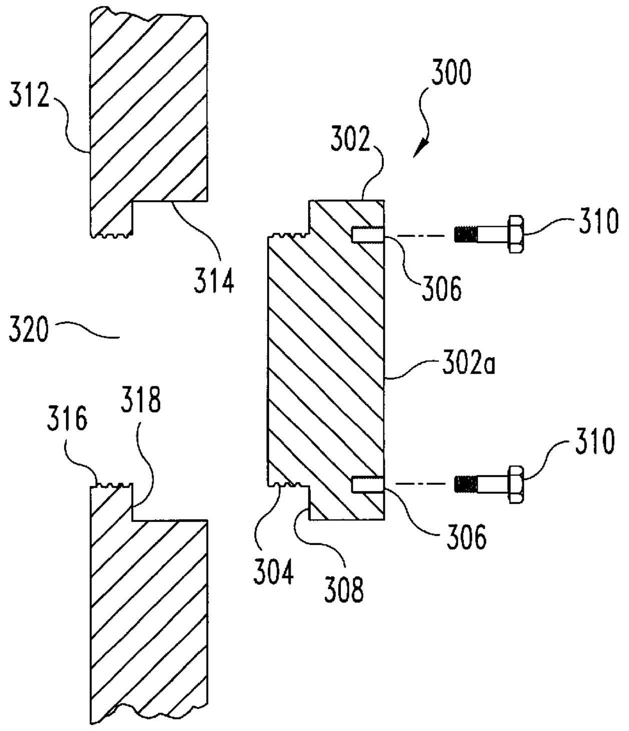
FIG. 9 is an exploded partial view in section of an urn wall and another embodiment wall engageable thereto.

Referring now to FIG. 9, there is shown another embodiment wall panel 300 positionable in hole 320 of wall 312. Wall 312 can be the side wall of any of the urns described herein. Hole 320 includes an outer hole portion 314 extending about an inner hole portion 316. An outwardly facing bearing surface 318 extends between outer hole portion 314 and inner hole portion 316.

Wall panel 300 includes an outer panel portion 302 and a radially offset inner panel portion 304 extending therefrom. Inner panel portion 304 is positionable in inner hole portion 316, and outer panel portion 302 is positionable in outer hole portion 314. Lip 308 is provided on an inner surface of outer panel portion 302, and lip 308 extends about inner panel portion 304. Lip 308 is positionable against bearing surface 318 to provide a positive seat against which wall panel 300 can be placed when positioned in hole 320. Bearing surface 318 can also be positioned relative to outer panel portion 302 and inner panel portion 304 such that the outwardly facing surface 302*a* of outer panel portion 302 is aligned with the exterior surface of urn wall 312.

Wall panel 300 can include threads around inner panel portion 304 and/or outer panel portion 302 for threadingly engaging threads formed in wall 312 about corresponding locations of hole 320. For example, offset panel portion 304 can be threaded to mate with threads provided around inner hole portion 316. Wall panel 300 can also be provided with engagement means 306 for engaging one or more removal and insertion devices 310. Wall panel removal and insertion devices 310 can be used move wall panel 300 relative to wall 312 in order to pull wall panel 300 from hole 320, to push wall panel 300 into place in hole 320, and or to threadingly engage wall panel 300 to hole 320.

In the illustrated embodiment, engagement means 306 include bores threaded into outer panel portion 302 from exterior surface 302*a*. Devices 310 can be threadingly engaged in respective ones of the bores. The bores can be covered and/or sealed when not in use and before wall panel 300 is sealed to wall 312 by, for example, a plug or grout, and can be permanently closed when, if desired, the crematory remains are placed in the receptacle defined by wall 312. Devices 310 can be bolts or screws as illustrated which provide a handle extending from wall panel 300. Devices 310 can also be, for example, a threaded rod, T-handle, or a U-shaped handle with each end engaged in one of the engagement means 306.

Figure 10:
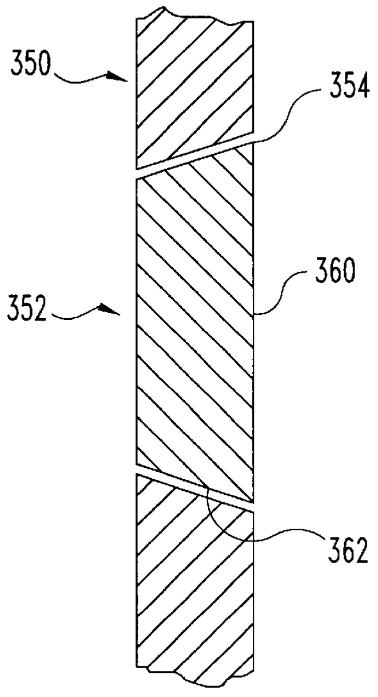
FIG. 10 is a partial view in section of an urn wall and further embodiment wall panel positioned wall.

As shown in FIG. 10, other embodiments contemplate that the urn wall 350 includes a hole 352 having a tapered surface 354 extending therearound. Wall panel 360 includes a tapered sidewall 362 therearound that fits against tapered surface 354. The interfitting tapered surfaces 354, 362 provide a positive seat against which wall panel 360 can be positioned, and also provides for alignment of the exterior surfaces of wall 350 and wall panel 360.

Figure 11A:
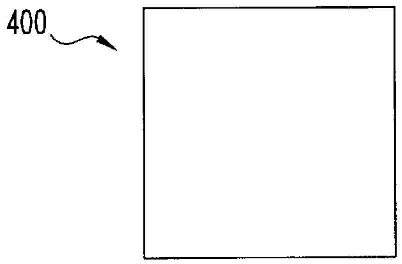
FIGS. 11(*a*) and 11(*b*) are plan views of alternate embodiment wall panels.
Figure 11B:
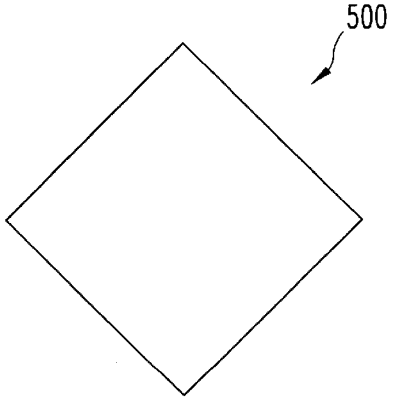

Various shapes for the wall panels a viewed when secured to the urns are also contemplated. In FIG. 7, wall panels 100, 102 have a circular shape. In FIG. 11(*a*), wall panel 400 has a square shape. In FIG. 11(*b*), wall panel 500 has a diamond shape. Examples of other shapes contemplated include rectangular shapes, cross-shapes, polygonal shapes, and oval shapes.

The wall panels in the side walls of the urns of urn display systems 10, 110 provide convenient access to the receptacle for storage of the crematory remains after the systems are assembled. It is also contemplated that urn display systems that include a single urn, such as shown in FIG. 4, or more than two urns, such as shown in FIG. 5, could be provided with wall panels in each of the urns. The wall panels allow systems 10, 110 to be completely assembled in the desired configuration and location before storage of the crematory remains without disassembly for later storage of the crematory remains. For example, a memorial garden for a family or for family pets can be built that includes one or more of the urn display systems described herein along with the desired landscaping, walkways and the like. Crematory remains can be added to the individual urns of the display systems in the garden as family members or pets decease and are cremated.

Before placement of the crematory remains, the wall panels can be secured to the urns using fasteners such as bolts and plates, retaining clips, by a threaded or interference fit between the wall panel and the sides of the hole extending around the wall panel, or by an interference fit between the wall panel and material placed on the sides of the hole extending around the wall panel such as an elastomer or other suitable gasket material. After placement of the crematory remains, it may de desired to seal the urn receptacle to prevent unauthorized access thereto. An epoxy, glue or other sealant or gasket material can be placed between the wall panel and the sides of the hole in the urn wall to prevent removal of the wall panel and seal it to the wall of the urn.

It is contemplated that the wall panel can be fabricated by cutting or coring the wall panel directly from the wall of the urn before or after assembly. In this manner, the wall panel is made from the same material as the wall of the urn and blends therein when assembled to the urn. If the urn material is marble or stone, then the wall and wall panel would be opaque, concealing the contents in the urn. Memorial information or other indicia can be provided on the wall panel in order to identify the crematory remains. It is further contemplated that the wall panel could be provided in a material that differs from that of the urn wall. Such a wall panel may be desirable, for example, if memorial information or decorative features were inscribed or provided on the wall panel and/or the wall panel were to contrast the remaining portion of the urn to which it is attached.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An urn display system, comprising:

a columnar arrangement including at least a first urn and a second urn placed one upon the other, each of said first urn and said second urn including:

a receptacle and a wall extending about said receptacle, said wall extending between a bottom portion and an upper portion and said receptacle opening at said upper portion, wherein each of said first urn and said second urn include a hole in a vertically extending portion of said wall in communication with said receptacle and a wall panel in said hole engageable to said wall, said hole being sized to receive crematory remains therethrough when said wall panel is removed.

2. The system of claim 1, wherein said wall panel has a shape selected from the group consisting of: circular, square, and diamond.

3. The system of claim 1, wherein said wall has a thickness between an inner surface and exterior surface thereof and said wall panel has a thickness that is the same as said thickness of said wall.

4. The system of claim 1, wherein said hole is sized to receive crematory remains therethrough for storage in said receptacle when said wall panel is removed.

5. The system of claim 4, wherein said wall panel is sealingly engaged to said wall after placement of crematory remains through said hole.

6. The system of claim 1, wherein said wall panel is threadingly engaged to said wall in said hole.

7. The system of claim 1, wherein:

said hole includes an outer hole portion and a smaller inner hole portion and a bearing surface extending therebetween in the direction of said wall; and said wall panel includes an outer panel portion, a smaller inner panel portion extending from said outer panel portion, and a lip therebetween, said lip being positioned against said bearing surface when said wall panel is positioned in said hole.

8. The system of claim 1, wherein:

said hole is tapered from an exterior wall surface to an interior wall surface; and said wall panel includes at least one side wall therearound tapered to fit said tapered hole with an exterior surface of said wall panel in alignment with said exterior surface of said wall.

9. The system of claim 1, wherein said wall includes an inner surface extending about said receptacle, said inner surface having a threaded portion extending therealong at said upper portion, said hole being positioned below said threaded portion.

10. The system of claim 1, wherein said wall panel and said wall are comprised of the same material.

11. The system of claim 10, wherein said material is opaque.

12. The system of claim 1, wherein each of said wall panels is flush with an outer surface of said wall of a respective one of said first and second urns when engaged thereto.

13. The system of claim 1, wherein each of said wall panels is comprised of the same material as said wall of a respective one of said first and second urns.

14. An urn display system, comprising:

a first urn having a first receptacle and a first wall extending about said first receptacle from a bottom portion to an upper portion of said first urn, a second urn having a second receptacle and a second wall extending about said second receptacle from a bottom portion to an upper portion of said second urn, said first and second urns including means for securing said second urn on said first urn, wherein said first urn has a wall panel in a vertically extending portion of said wall and positionable in a hole in said vertically extending portion of said first wall communicating with said first receptacle.

15. The system of claim 14, wherein said second urn has a wall panel positionable in a hole in said second wall communicating with said second receptacle.

16. The system of claim 14, wherein said means for securing includes said first receptacle extending through said upper portion of said first urn and said bottom portion of said second urn including a stem extending downwardly therefrom received in said first receptacle.

17. The system of claim 16, wherein said hole in said first wall of said first urn is positioned entirely below said stem when said stem is received in said first receptacle.

18. The system of claim 16, wherein said means for securing further includes said first receptacle being threaded at said upper portion of said first urn and said stem of said second urn being threadingly received in said threaded upper portion of said first urn.

19. The system of claim 18, further comprising:

a third urn having a third receptacle and a third wall extending about said third receptacle from a bottom portion to an upper portion of said third urn, said bottom portion of said third urn including a stem extending downwardly therefrom; and said second receptacle extends through and is threaded at said upper portion of said second urn, wherein said stem of said third urn is threadingly received in said threaded upper portion of said second urn.

20. The system of claim 19, wherein:

said second urn has a removable wall panel positioned in a hole in said second wall communicating with said second receptacle; and said third urn has a removable wall panel positioned in a hole in said third wall communicating with said third receptacle.

21. The system of claim 14, wherein said means for securing includes said upper portion of said first urn having an inset wall portion and said bottom portion of said second urn having a recess positionable about said inset wall portion.

22. The system of claim 14, wherein said first receptacle extends through and opens at said upper portion of said first urn and said second receptacle extends through and opens at said upper portion of said second urn.

23. The system of claim 22, wherein said second urn has a wall panel removably engaged in a hole in said second wall communicating with said second receptacle.

24. The system of claim 23, wherein said first receptacle is accessible from each of said upper portion and said hole of said first urn when said wall panel of said first urn and said second urn are removed and said second receptacle is accessible from each of said upper portion and said hole of said second urn when said wall panel of said second urn is removed.

25. The system of claim 14, wherein said wall panel is flush with an outer surface of said wall of said first urn when engaged thereto.

26. The system of claim 14, wherein said wall panel is comprised of the same material as said wall of said first urn.

27. An urn display system, comprising:

an urn having a receptacle and a wall extending about said receptacle from a bottom portion to an upper portion, said receptacle opening at said upper portion and sized to receive crematory remains therethrough for placement in said receptacle, said urn further comprising a wall panel positioned in a hole in a vertically extending portion of said wall communicating with said receptacle thereof, said hole being sized to receive crematory remains therethrough for placement in said receptacle when said wall panel is removed from said hole.

28. The system of claim 27, further comprising a cap positionable on said urn to close said receptacle opening at said upper portion.

29. The system of claim 27, wherein said urn is stackable with one or more other urns to provide a columnar arrangement.

30. The system of claim 27, wherein said wall panel is sealingly engaged to said wall after placement of crematory remains in said receptacle.

31. The system of claim 27, wherein said wall panel is threadingly engaged to said wall.

32. The system of claim 27, wherein:

said hole includes an outer hole portion and a smaller inner hole portion and a bearing surface extending therebetween in the direction of said wall; and said wall panel includes an outer panel portion, a smaller inner panel portion extending from said outer portion and a lip therebetween, said lip positionable against said bearing surface when said wall panel is positioned in said hole with said inner panel portion received in said inner hole portion and said outer panel portion received in said outer hole portion.

33. The system of claim 27, wherein:

said hole is tapered from an exterior wall surface to an interior wall surface of said wall; and said wall panel includes at least one sidewall therearound tapered to fit said tapered hole with an exterior surface of said wall panel in alignment with said exterior surface of said wall.

34. The system of claim 27, wherein said wall includes an inner surface extending about said receptacle having a threaded portion extending therealong at said upper portion, said hole being positioned below said threaded portion.

35. The system of claim 27, wherein said wall panel is flush with an outer surface of said wall of said urn when engaged thereto.

36. The system of claim 27, wherein said wall panel is comprised of the same material as said wall of said urn.

* * * * *